(12) United States Patent
Belser et al.

(10) Patent No.: US 6,345,021 B1
(45) Date of Patent: Feb. 5, 2002

(54) SYSTEM AND METHOD OF EFFICIENT SERVO SECTOR ENCODING

(75) Inventors: Karl A. Belser; Alan A. Fennema, both of San Jose, CA (US)

(73) Assignee: Seagate Technology, Scotts Valley, CA (US)

( * ) Notice: Subject to any disclaimer, the term of this patent is extended or adjusted under 35 U.S.C. 154(b) by 0 days.

(21) Appl. No.: 09/189,234

(22) Filed: Nov. 10, 1998

(51) Int. Cl.[7] .................................................. G11B 7/00
(52) U.S. Cl. ..................................... 369/47.1; 369/53.11
(58) Field of Search ............................... 369/47, 48, 49, 369/50, 54, 58, 59, 60.1, 32; 360/48, 75, 69, 51, 77.08, 77.06, 78.04, 78.14, 77.05

(56) References Cited

U.S. PATENT DOCUMENTS 5,640,538 A * 6/1997 Dyer et al. .......... 360/77.05 X
5,926,336 A * 7/1999 Le et al. ...................... 360/75

* cited by examiner

Primary Examiner—Muhammad Edun
(74) Attorney, Agent, or Firm—Simon & Koerner LLP

(57) ABSTRACT

A system and method for encoding servo sector information in a nonvolatile data storage and retrieval system using rotating recording disks. Servo sectors are angularly-spaced approximately radial regions reserved for position reference and tracking adjustment information. Servo timing marks including means for detecting defects on the recording surface, encoded track address and sector address data, and position error signal blocks are permanently fabricated into a number of servo sectors. The present invention helps the storage system controller locate, certify, and follow any particular track and sector while maximizing the amount of disk surface area available for data storage and retrieval.

38 Claims, 10 Drawing Sheets

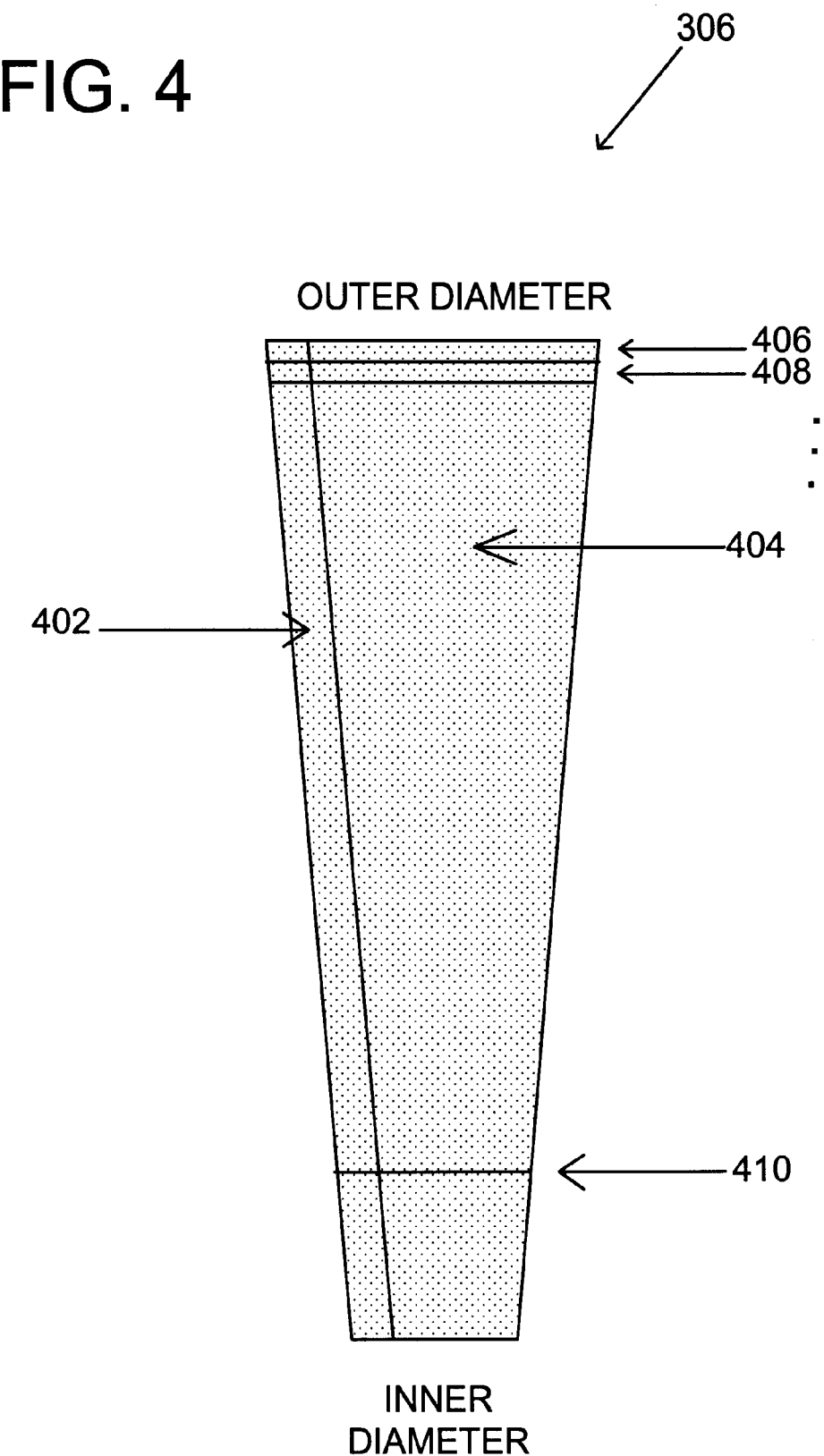

FIG. 7  Z BIT DISTRIBUTION

| SERVO SECTOR NUMBER FOR SECTORS 0 – 247 (MODULO 8) | 0 | 1 | 2 | 3 | 4 | 5 | 6 | 7 |
|---|---|---|---|---|---|---|---|---|
| Z BIT | Y8 | Y9 | Y10 | Y11 | Y12 | Y13 | Y14 | Y15 |
| SERVO SECTOR NUMBER FOR SECTORS 248-254 | 248 | 249 | 250 | 251 | 252 | 253 | 254 | |
| Z BIT | Y8 | Y9 | Y10 | Y11 | Y12 | Y13 | Y14 | |

FIG. 8  X BIT DISTRIBUTION

| SERVO SECTOR NUMBER FOR SECTORS 0 – 247 (MODULO 8) | 0 | 1 | 2 | 3 | 4 | 5 | 6 | 7 |
|---|---|---|---|---|---|---|---|---|
| X BIT | 0 | 0 | 0 | 1 | 0 | 1 | 1 | 1 |
| SERVO SECTOR NUMBER FOR SECTORS 248-254 | 248 | 249 | 250 | 251 | 252 | 253 | 254 | |
| X BIT | 0 | 0 | 0 | 1 | 0 | 1 | 1 | |

SYSTEM AND METHOD OF EFFICIENT SERVO SECTOR ENCODING

CROSS-REFERENCE TO RELATED APPLICATIONS

This application is related to patent application Ser. No. 08/825,651, entitled "System and Method to Compensate for Data Defects Within a Magneto-Optical Computer Memory Device," filed on Apr. 3, 1997 and patent application Ser. No. 08/866,174, entitled "System and Method For Generating Position Error Signals Within A Magneto-Optical Computer Memory Device," filed on Jun. 30, 1997. The subject matter of each of these related applications is incorporated herein by reference. All related applications are commonly assigned.

BACKGROUND OF THE INVENTION

1. Field of the Invention

The present invention relates generally to nonvolatile data storage systems, and more particularly to such systems having storage mechanisms including read/write heads that are indexed and precisely positioned via encoded servo sectors.

2. Description of the Background Art

Designers, manufacturers, and users of computing systems require reliable and efficient digital information storage and retrieval equipment. Conventional magnetic disk drive storage systems have been commonly used and are well known in the art. These storage systems typically use a flying magnetic read/write head to record and retrieve data from a layer of magnetic recording material on the surface of a rotating recording disk. The capacity of such a storage system is a function of the number of closely spaced concentric tracks on the recording disk that may be reliably accessed by the read/write head. Some of the recording disk surface area is used for purposes other than data storage, however.

Means for assuring the proper selection of a particular track by the read/write head are required for reliable data storage and retrieval. The read/write head should also be kept centered over a particular track as the recording disk rotates, to prevent accidental over-writing of data stored in neighboring tracks. Some systems use nonmagnetic guard rings between discrete tracks on the recording disk to help keep the head from skipping off-track. Gain control references should be placed at different locations on the recording disk to calibrate the electronic amplifiers used to reliably read back data signals. Time delays are also needed to allow the magnetic read/write head to demagnetize after recording data, to prevent unintentional over-writing of subsequently accessed locations. The designs created to accomplish these goals take up some of the available recording disk surface area, and thus reduce overall system capacity.

Various types of indexing marks and alignment indicia are also recorded on the recording disk surface for precise position reference and tracking adjustment of the read/write head. These marks and indicia are often recorded in servo sectors, which are angularly-spaced reserved portions of the recording disk surface that extend out approximately radially from the recording disk centers. Track addresses are sometimes recorded in servo sectors. Angular synchronization signals that determine the circumferential location of the magnetic head may also be recorded in servo sectors. Normal and quadrature servo blocks are often recorded in servo sectors for generation of position error signals that are used to keep the read/write head aligned. Servo sectors use recording disk surface area that could otherwise be used for data storage, however, so servo sector information should be stored as efficiently as possible.

Newer magneto-optical technology offers many improvements over conventional magnetic technology, particularly in terms of increased capacity. Magneto-optical storage systems also record data onto a recording material coated onto the surfaces of one or more rotating recording disks, but via different means than conventional drives. The recording material undergoes a sharp increase in magnetic susceptibility when heated beyond its Curie point, the temperature at which the magnetic properties of the recording material change from ferromagnetic to paramagnetic. A localized magnetic domain is created by heating a region of the recording material and then applying a magnetic field of a desired orientation to the heated region. When the recording material cools, the localized magnetic domain retains its magnetic orientation and again becomes far less susceptible to applied magnetic fields.

An optical fiber may guide an intense beam of focused laser light to heat a localized magnetic domain to be recorded or overwritten. The data stored in a particular localized magnetic domain may also be read back nondestructively by such a combined laser and optical fiber system. A low-powered, linearly polarized laser beam focused on a particular localized magnetic domain will be reflected with a Kerr rotation of the angle of polarization determined by the magnetic orientation of the localized magnetic domain. The pattern of polarization rotations read back as the low-powered laser beam moves across the recording surface thus represents the pattern of magnetic orientations previously written onto the recording surface. The overall reflectivity of a localized magnetic domain may also be determined via measurement of the relative amplitude of the reflected laser beam.

Magneto-optical storage systems should quickly and reliably locate and align to any particular storage location on the recording disk, as with existing storage systems. A scheme for accomplishing these goals that takes advantage of the unique properties of a magneto-optical storage system is needed. An efficient system for encoding servo sector information is therefore important for maximizing the amount of remaining disk surface area available for data storage and retrieval.

SUMMARY OF THE INVENTION

In accordance with the present invention, a system and method are disclosed for efficiently encoding servo sector information in a data storage system using rotating magneto-optical recording disks. In the preferred embodiment, servo sectors are angularly-spaced portions of the recording disk surface that extend out radially from the disk centers and include position reference and tracking adjustment information for read/write heads. The fraction of the recording disk surface occupied by servo sectors should be minimized to maximize storage capacity.

Servo sector patterns are quickly stamped into recording surfaces during manufacture and can simultaneously improve many aspects of prior storage systems. Automatic gain control reference blocks of conventional magnetic storage systems are rendered unnecessary because the reflectivity of the servo sectors is uniform across the recording disk surface. Write-to-read recovery time, usually needed to allow a high-intensity recording laser beam to reduce power to the level used for reading data, is also unnecessary when servo sector patterns are indelible. Servo timing marks are preferably embossed into each of the servo sectors to help synchronize data storage and retrieval with the rotation of the recording disks. The servo timing marks may also serve as part of a system to detect defects on the recording disk surfaces. Encoded track address data and sector address data, and position error signal blocks are also preferably permanently affixed into each of the servo sectors to help the read/write heads locate and follow a particular track.

In the preferred embodiment, servo sector information is read via reflectivity measurement, not the magnetically-induced Kerr rotation measurement used for data storage and retrieval in magneto-optical systems. Since the servo timing marks therefore do not need to be discriminated from data, error correction efficiency is roughly doubled. Surface reflectivity between distinct servo timing marks preferably certifies the recording surface as reliable for writing, eliminating the need for read-back verification delays.

The radial seeking speed of the read/write head is increased in the preferred embodiment by use of only a few lower-order track address bits on every sector. The full track address is rarely needed because the target track is typically selected from only a small number of frequently-scanned neighboring tracks having almost identical addresses. Higher-order track address bits may be distributed across consecutive servo sectors because they are needed only as a less frequent confirmation that the lower-order track address bits are properly wrapped, that is, successfully ramped through neighboring low-to-high and high-to-low address transitions.

A repeating sequence of bits distributed around the circumference of the recording disk in the preferred embodiment verifies the servo sector number kept in a counter in a disk controller. The sequence of distributed bits also identifies the phase of the distributed higher-order track address bits for proper significance assignment. A timing mark to enable precise rotation synchronization by the disk controller preferably comprises either a higher-order track address bit or its complement, to guarantee that a positive mark will always be available for detection and use.

The present invention thus enables the storage system to quickly and reliably locate, certify, and follow any particular track and sector while maximizing the amount of disk surface area available for data storage and retrieval.

BRIEF DESCRIPTION OF THE DRAWINGS

FIG. 4 is a linearized diagram of one embodiment of a sector of the FIG. 3 recording disk, in accordance with the present invention;

FIG. 7 is a table summarizing one embodiment for a Z bit distribution versus sector number, in accordance with the present invention;

FIG. 8 is a table summarizing one embodiment for an X bit sequence, denoting a repeating pattern used to identify circumferential phase of a sector and to detect completion of a full rotation of the recording disk, in accordance with the present invention;

DETAILED DESCRIPTION OF THE PREFERRED EMBODIMENT

The present invention is a system and method of efficiently encoding servo sector information in a data storage system using magneto-optical recording disks.

Figure 1:
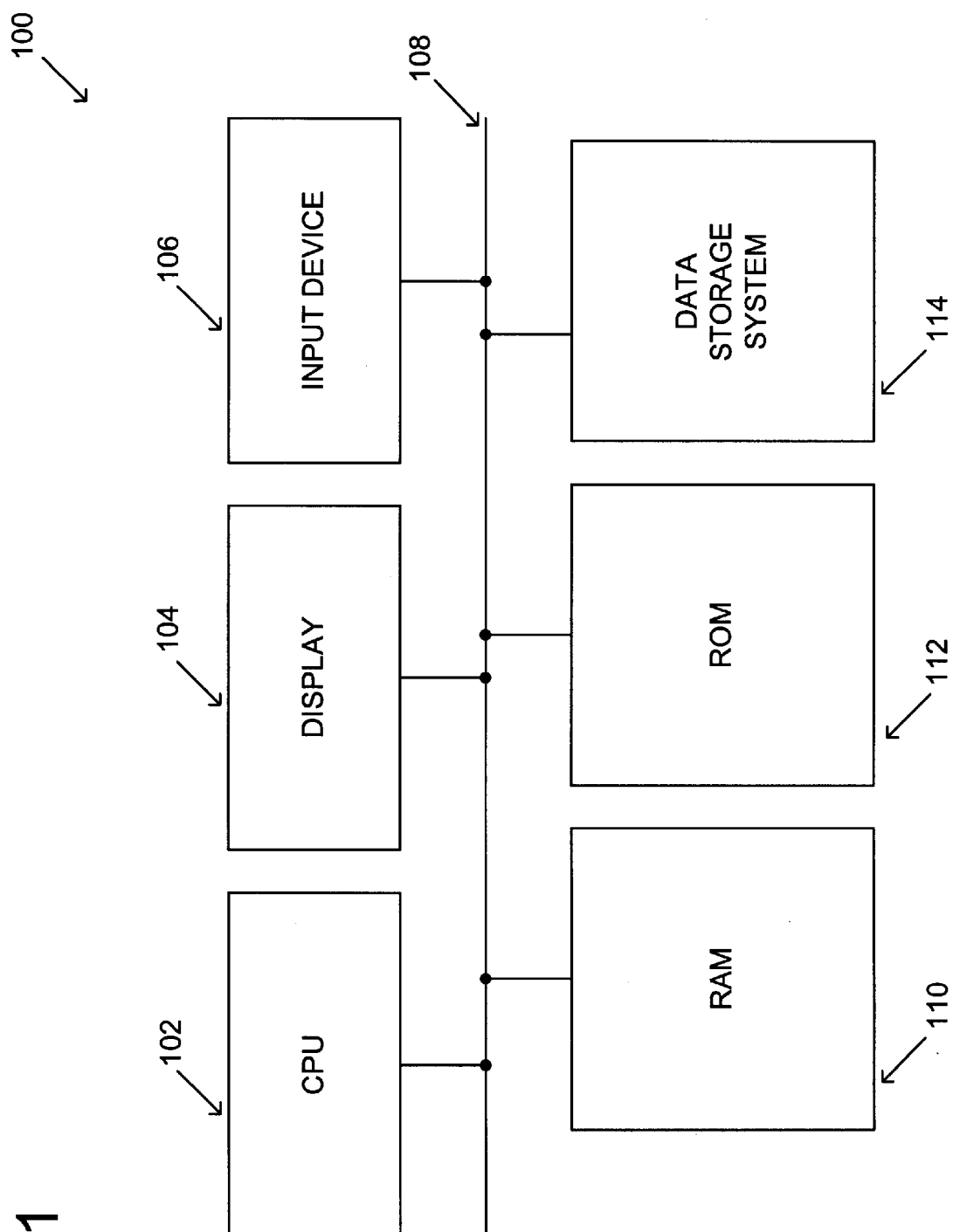
FIG. 1 is a diagram of one embodiment of a computer system, in accordance with the present invention.

Referring now to FIG. 1, one embodiment of a computer system 100 is shown. The computer system of FIG. 1 preferably includes a central processing unit (CPU) 102, a display 104, an input device 106, a data bus 108, random access memory (RAM) 110, read-only memory (ROM) 112, and a data storage system 114.

Figure 2:
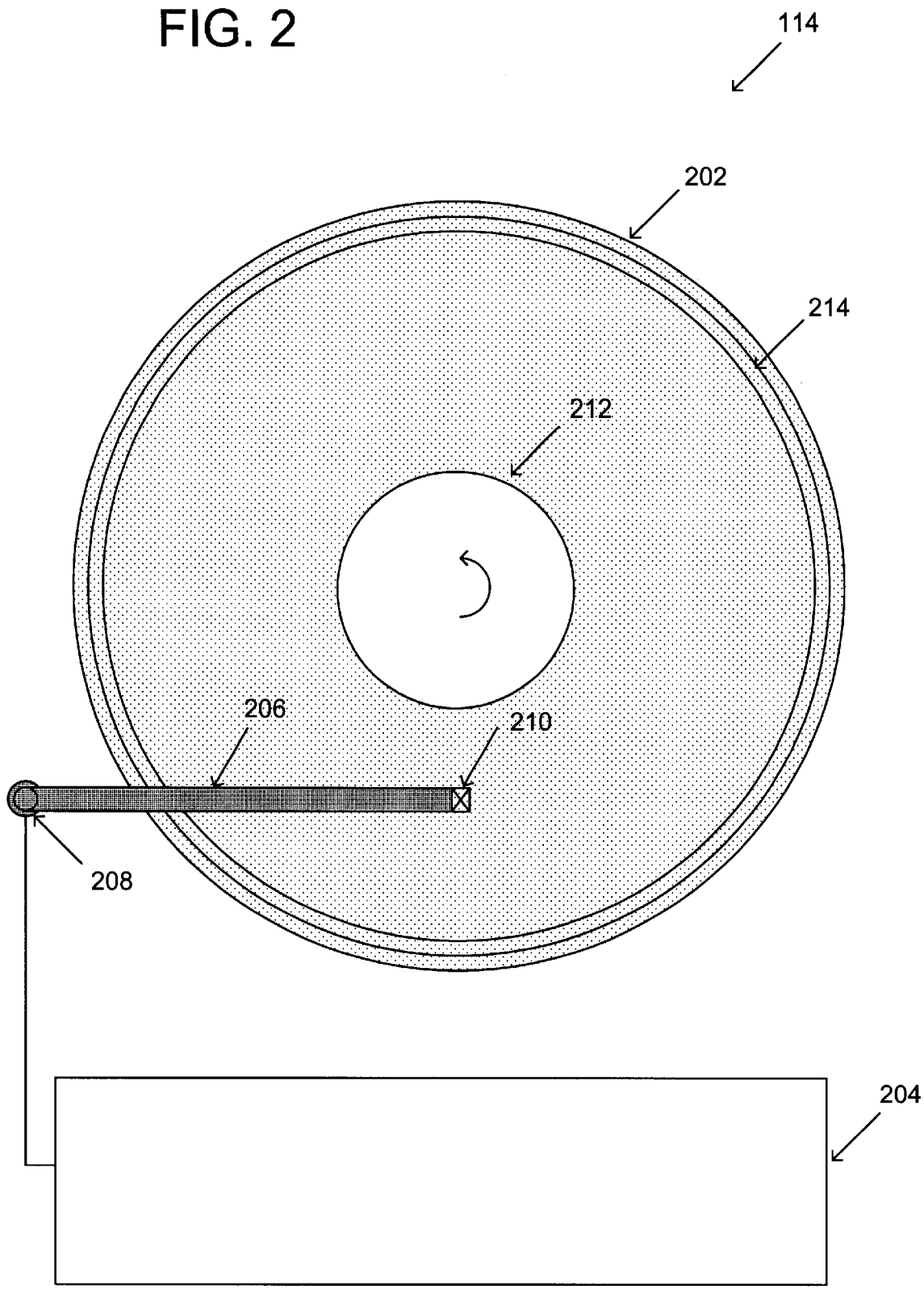
FIG. 2 is a diagram of one embodiment of the FIG. 1 data storage system, in accordance with the present invention.

Referring now to FIG. 2, one embodiment of the FIG. 1 data storage system 114 is shown. The data storage system 114 of FIG. 2 preferably includes a recording disk 202, a storage system controller 204, a servo arm 206, a servo actuator 208, a read/write head 210, and a rotating spindle 212. Read/write head 210 is positioned at the end of servo arm 206 which is moved via servo actuator 208, and transfers data between storage system controller 204 and a specific physical location on recording disk 202. Data is preferably stored in many approximately consecutively-numbered concentric rings or "tracks" 214 on recording disk 202; only two tracks 214 are shown for clarity. Storage system controller 204 in the preferred embodiment may thus randomly access a specific logical location on recording disk 202 via a particular track address and a particular sector address. Tracks 214 are very closely spaced in the preferred embodiment to maximize storage capacity and economy. The mechanical precision of the movement of recording disk 202 and the movement of read/write head 210 is often far below the precision of track 214 spacing, however. Storage system controller 204 thus requires some means for precisely maintaining read/write head 210 over any track 214 and for positioning read/write head 210 quickly and accurately over other tracks 214 for subsequent storage and retrieval operations.

Figure 3:
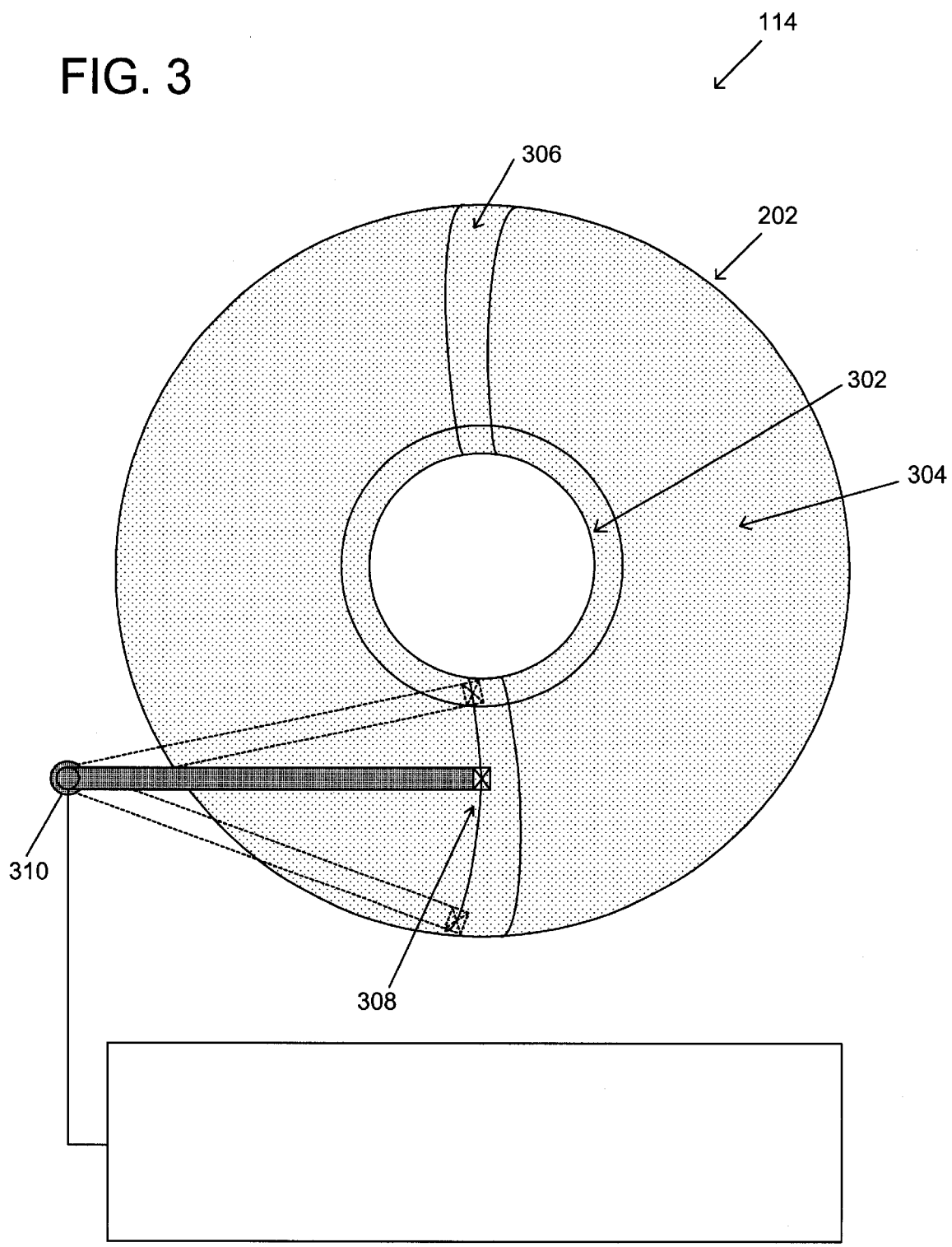
FIG. 3 is a diagram of an upper surface of a recording disk, in accordance with the present invention.

Referring now to FIG. 3, an upper surface of recording disk 202 used in data storage system 114 is shown. The upper surface of recording disk 202 of FIG. 3 preferably includes a startup zone 302, a useable data zone 304, arc-shaped sectors 306, and an arc-shaped path 308 taken across recording disk 202 surface by read/write head 210. Servo arm 206 turns around an actuator axis 310 to position read/write head 210 relative to the center of spindle 212. Read/write head 210 thus traces out arc-shaped path 308 over the recording disk 202 surface in the preferred embodiment. Deviation of arc-shaped path 308 from a purely radial line varies by track 214 number and in the preferred embodiment is given by:

$$x = (OD - n \cdot TP) \cdot \left[ \cos^{-1}\left( \frac{\sqrt{B^2 - A^2}}{B} \right) - \cos^{-1}\left( \frac{(OD - n \cdot TP)^2 + B^2 - A^2}{2 \cdot (OD - n \cdot TP) \cdot B} \right) \right]$$

where x is the deviation in micrometers, n is the track 214 number, OD is the radius of outermost diameter track 214 number zero (nominally 64,600 micrometers), A is the length of servo arm 206 from actuator axis 310 to the point of read/write head 210 focus (nominally 66,789 micrometers), B is the distance from the center of spindle 212 to actuator axis 310 (nominally 76,937 micrometers), and TP is the track 214 pitch. Tracks 214 are preferably numbered sequentially from zero at the outermost edge of recording disk 202 to higher values toward the center of recording disk 202.

Each recording disk 202 in the preferred embodiment is nominally 130 millimeters in diameter and is coated with a magneto-optical recording material on both the upper and lower surfaces. In the preferred embodiment, recording disks 202 rotate counterclockwise when viewed from above. There are 255 sectors 306 (numbered 0 through 254) and 55,776 concentric tracks 214 in the preferred embodiment. Each track 214 is nominally 0.71 micrometers in radial pitch in the preferred embodiment. Startup zone 302 is the approximately two millimeters of inner radial width, totaling 2,816 tracks 214 in the preferred embodiment. All data positions in startup zone 302 are positively written, that is, magnetized for Kerr rotation in the preferred embodiment, to measure the relative amplitude of the read back signal for laser power calibration and to set amplifier gains. Useable data zone 304 extends over the remaining surface of recording disk 202, spanning 52,960 tracks 214 in the preferred embodiment, although the outermost 1,276 tracks 214 may also be used for internal drive calibration.

Referring now to FIG. 4, a linearized diagram of one embodiment of an exemplary sector 306 of the FIG. 3 recording disk 202, a servo sector 402, a data wedge 404, a pair of neighboring numbered concentric tracks 406 and 408, and a border 410 between startup zone 302 and useable data zone 304 are shown. Data wedge 404 preferably includes stored user data, while servo sector 402 includes address and alignment information used by storage system 114.

Although FIG. 4 is a linearized diagram, for simplicity, it is important to note that the actual shape of any servo sector 402 in the preferred embodiment is determined by the equation given above. Servo sectors 402 are preferably not recorded on the surface of recording disk 202 by read/write head 210 as in some magnetic storage systems, but instead are indelibly stamped into recording disk 202 surface during manufacture. Information stored in servo sectors 402 thus cannot be overwritten by data storage system 114. In practice, the deviation described by the equation given above is used to delay the mechanism used to produce the master servo sector patterns to be stamped into recording disks 202 during manufacture. Two master servo sector patterns are needed in the preferred embodiment, one for upper surfaces and one for lower surfaces of recording disks 202.

The precise shape of each arc-shaped path 308 taken by read/write head 210 should exactly align with the pattern of servo sectors 402 embossed into each recording disk 202 surface. As servo arm 206 turns around actuator axis 310, read/write head 210 should move over the surface of recording disk 202 and precisely circumferentially match up with the beginning of each servo sector 402.

Figure 5A:
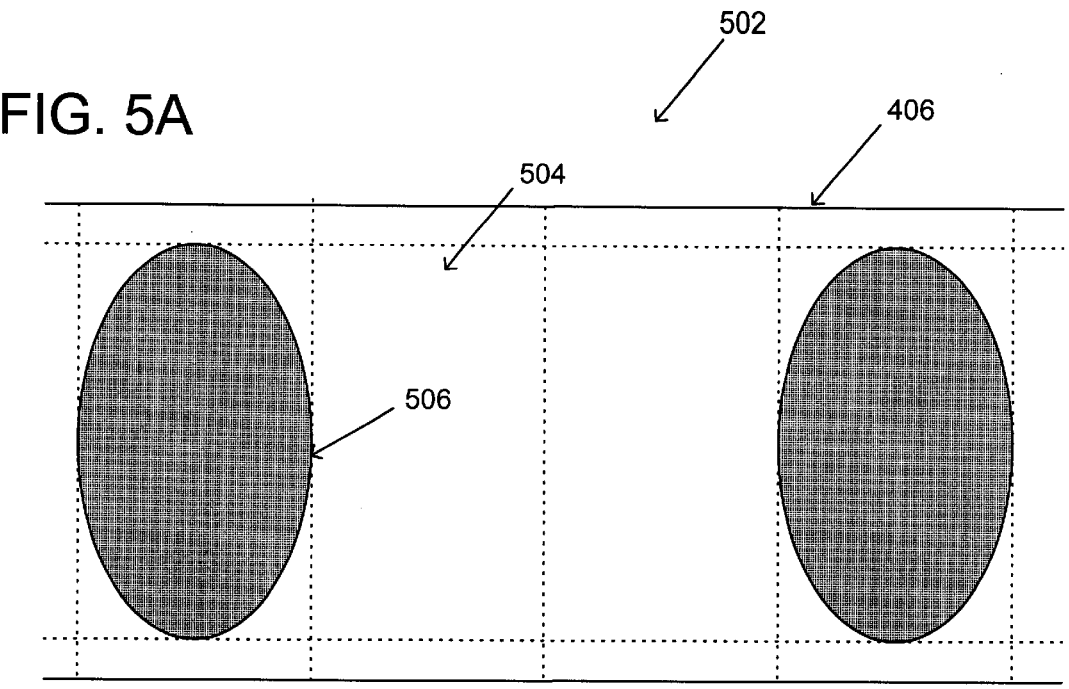
FIG. 5A is a diagram of one embodiment of the physical layout of a servo timing mark, in accordance with the present invention.

Referring now to FIG. 5A, one embodiment of the physical layout of a servo timing mark 502 is shown. Servo timing mark 502 is preferably the first type of information read from servo sector 402. Servo timing marks 502 denote the beginning of servo sector 402 and the end of data wedge 404 in the preferred embodiment. Each servo sector 402 of each track 214 preferably includes a servo sector pattern, comprising a number of positions 504 which may be blank or which may include a full-width elliptical flat-bottom quarter-wavelength pit 506. These pits 506 appear optically dark (are of low overall reflectivity) due to destructive interference, and are preferably patterned into each track 214 of each servo sector 402 during manufacture. Each pit 506 in the preferred embodiment is 0.59 micrometers in radial length and 0.35 micrometers in circumferential width, and denotes one bit of information. Pits 506 cannot be altered by the laser beam and magnetic field used for data storage, so they are indelible after manufacture. In the preferred embodiment, there are 132,600 pit positions 504 per complete rotation of recording disk 202, with 38 pit positions 504 on each servo sector 402 and 520 pit positions 504 in each data wedge 404 between servo sectors 402. The reflectivity of the pits 506 is uniform across the surface of the recording disk 202 in the preferred embodiment, so automatic gain control references are not required on every servo sector 402 as they typically are with existing magnetic storage systems. This space may thus be used to increase storage capacity available to the user. The write-to-read recovery time usually needed to allow the recording mechanism to turn off is not needed when servo sectors 402 following data wedges 404 are indelible. This further increases storage capacity and also increases system speed.

Figure 5B:
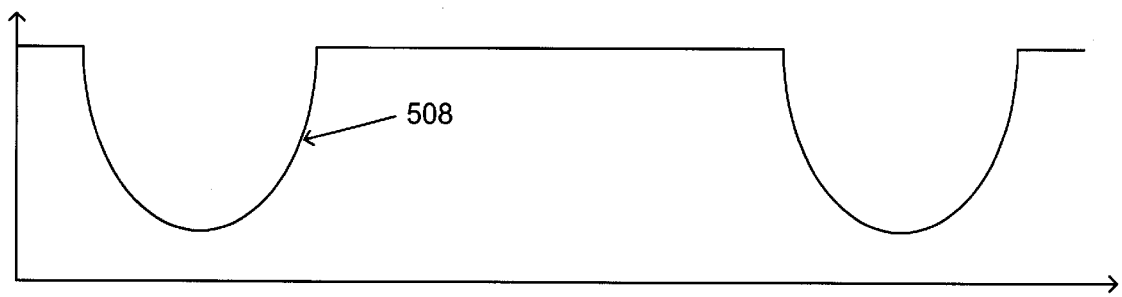
FIG. 5B is a graph of track reflectivity, in accordance with the present invention.

Referring now to FIG. 5B, a graph of track reflectivity is shown. Servo sector information is read via dips 508 in reflectivity measurement due to servo sector pits 506 as recording disk 202 rotates. Note that servo sector pits 506 are not read via the magnetically-induced Kerr rotation measurement used for data storage and retrieval in the preferred embodiment. There is thus no need to discriminate servo timing marks 502 from recorded data because each is read via a different mechanism. Since servo timing marks 502 are known quantities, versus uncertain data, the error correction efficiency is roughly doubled.

Figure 5C:
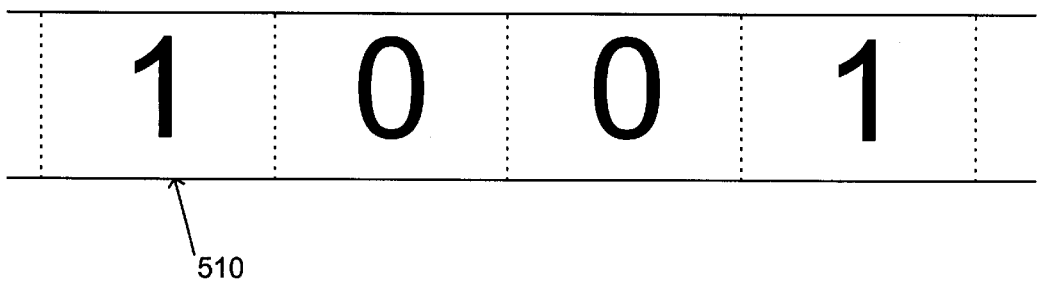
FIG. 5C is a depiction of one embodiment of reflectivity signal processing into digital bits, in accordance with the present invention.

Referring now to FIG. 5C, a depiction of one embodiment of reflectivity signal processing into digital bits is shown. Storage system controller 204 processes the reflectivity signals into digital bits 510 of encoded information. Servo timing mark 502 is preferably a simple four-bit pattern identifying the beginning of the servo sector 402. Servo timing mark 502 is specifically defined by two pits 506 separated by precisely two blank positions 504 in the preferred embodiment. The placement of two blank positions 504 between two pits 506 in servo timing mark 502 equates to a "1001" digital pattern, which reduces the chance of contamination-induced errors.

Figure 6:
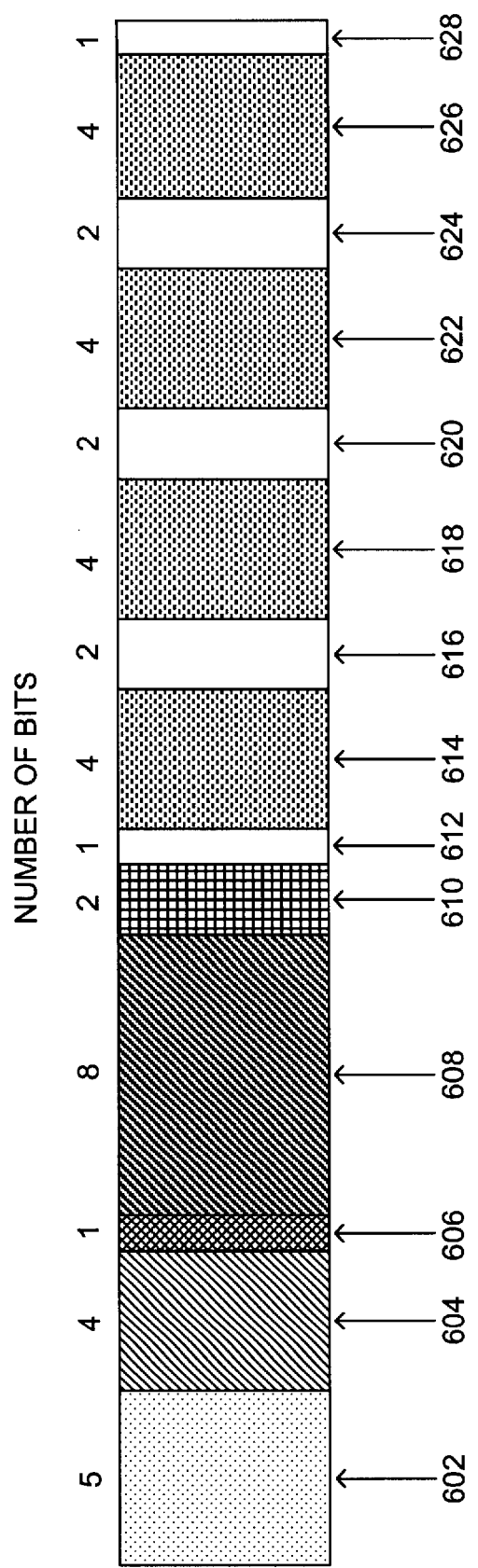
FIG. 6 is a logical diagram of one embodiment of a servo sector of a single track, in accordance with the present invention.

Referring now to FIG. 6, a logical diagram one embodiment for a servo sector 402 of a track 214 is shown. Servo sector 402 of FIG. 6 preferably includes a qualifying piece 602 of the preceding data wedge, a servo timing mark 604 as described above, encoded track address and sector address fields 606, 608, and 610, and position error signal blocks 614, 618, 622, and 626 that are separated by delay fields 612, 616, 620, 624, and 628. The servo timing marks are preferably also used to certify sectors by detecting defects on the magneto-optical recording surface through reflectivity measurement, in one example of the utilization of a priori information to increase storage system efficiency.

In the FIG. 6 embodiment, storage system controller 204 uses a group of five pit positions 504 in a qualifying piece 602 from data wedge 404 immediately preceding current servo sector 402 to further assure detection of contamination-induced errors. The reflectivity of these five positions 504 is preferably used to detect surface defects, but not to read any user data written onto those positions 504 via magnetic orientation. User data is read only via Kerr rotation measurement in the preferred embodiment. If the measured reflectivity of the last five positions 504 on a given data wedge 404 is not within an acceptable range, the current sector servo 402 and data wedge 404 as well as those preceding and following the present location are disqualified for storage. Reflectivity monitoring of both the data wedge qualifying piece 602 and the two positions 504 in servo timing mark 502 eliminates the need for read-after-write verification delays, further increasing the speed of the preferred embodiment of the system. Conversely, the presence of the valid data wedge qualifying piece 602 confirms the identity of servo timing mark 502. In the preferred embodiment, the servo sectors use only 7.25% of the total number of available pit positions to minimize overhead. Utilization of a priori information, specifically the knowledge that servo timing mark 502 should be preceded by data wedge qualifying piece 602, thus simultaneously increases system speed and decreases overhead.

Encoded track address data is also placed into servo sector 402. In the preferred embodiment, there are no guard rings between neighboring tracks 406 and 408 because such guard rings decrease the overall capacity and radial head speed of the storage system 114. Guard rings between tracks 214 are rendered unnecessary if read/write head 210 can be radially positioned quickly and precisely. In the preferred embodiment, sixteen bits of digital information are needed to uniquely address each track 214. However, only some of the low-order bits of a track address are needed on every servo sector 402 because immediately neighboring tracks 406 and 408 have track addresses that differ by only one value. Similarly, relatively close tracks 214 should have addresses that differ by only a few values. The speed of storage system 114 is preferably increased by using only enough lower-order track address bits on every servo sector 402 to correctly select from a small number of frequently scanned neighboring tracks 214 that are known to have almost identical addresses. The number of track address bits needed on each servo sector 402 depends on the highest seek speed desired, and also depends on read/write head 210 switching speed if data is stored on two different recording disk 202 surfaces accessed with two different read/write heads 210. Higher-order track address bits distributed across consecutive servo sectors 402 are thus needed only as a less frequent confirmation that the lower-order track address bits are properly wrapped. Higher-order track address bits may thus preferably be read less frequently without degrading overall storage system performance. Distribution of higher-order track address bits across consecutive servo sectors 402 is another example of the use of a priori information, specifically the knowledge that nearby tracks have similar track addresses, to increase system speed and storage efficiency.

The preferred embodiment of this invention Gray-encodes the high-order byte and the low-order byte of the track address separately. A Gray code is a sequence of binary numbers having only one bit change from one number to the next. The encoded lower byte of the track address is referred to as bits Y7–Y0 and is preferably stored in every servo sector 402 in field 608. The Gray-encoded higher byte of the track address is preferably not stored in every servo sector 402, but is instead distributed over eight consecutive servo sectors 402, one bit at a time in field 610. This is efficient because large changes in the track address do not occur very frequently, so there is no need to store the high-order byte of the track address in every servo sector 402. Each encoded higher-order track address bit stored in a given servo sector 402 is referred to as the Z bit.

Referring now to FIG. 7, a table summarizing one embodiment for a Z bit distribution is shown. Any particular sector address may be thought of as being a sum of a number of eights and some remainder from zero to seven; the modulo function returns such a remainder. The pattern of Z bits for a given track 214 will repeat in modulo 8 as recording disk 202 turns from sector zero through sector 247, and will then partially repeat for the remaining sectors numbered 248 through 254 in the preferred embodiment. As recording disk 202 rotates, sequential reading of eight Z bits will yield the bits of the high-order byte of the track address. However, the higher-order track address bits should be properly synchronized with the phase of the sectors, which is the sector address modulo 8 (the remainder after division by 8), so the eight Z bits read will be assigned to their proper significance in the high-order byte of the track address. Means for accomplishing this efficiently in the preferred embodiment are given in the discussion of sector address information immediately below, and in FIG. 8. The complement of the Z bit is preferably always written in each servo sector 402 just before the Z bit, in field 610 of FIG. 6, for reasons that will be subsequently described in the discussion of position error signal blocks of FIG. 9.

Sector address information is more easily managed than track address information because there are usually far fewer sectors 306 than tracks 214, and because there are usually fewer mechanical disturbances that may lead to sector address errors. A simple 8-bit counter in storage system controller 204 can preferably monitor the sector address as recording disk 202 rotates. However, it is possible that a stream of data could be recorded onto more than one recording disk 202 surface, requiring storage system 114 to switch to another read/write head 210 in midstream. Some of the lower-order sector address information may therefore be stored in a manner similar to that of the higher-order track address bits for verification of the sector number.

Referring now to FIG. 8, a repeating sequence of bits (preferably 00010111) placed around the circumference of every surface of every recording disk 202 with one bit per consecutive servo sector 402 in field 606 is shown. Each of these bits is referred to as the X bit in a particular servo sector 402. The interruption of the usual sequence after sector number 254 in the preferred embodiment is used as an index mark denoting the beginning of the circumference of the recording disk 202 with sector zero. This serves to verify that a full rotation of recording disk 202 has occurred. As recording disk 202 rotates, three sequential X bits can identify a phase of sector 306 even in the absence of a sector address counter. The phase of sector 306 is needed to calculate the high byte of the track address properly, as described above. There is an uncertainty of one servo sector 402 period when switching read/write heads 210, however, so four sequential X bits instead of three are used to identify the phase of sector 306 reliably in the preferred embodiment. This sequence verifies the sector number stored in the counter in storage system controller 204 and quickly identifies the phase of the distributed higher-order track address bits for proper significance assignment.

Figure 9:
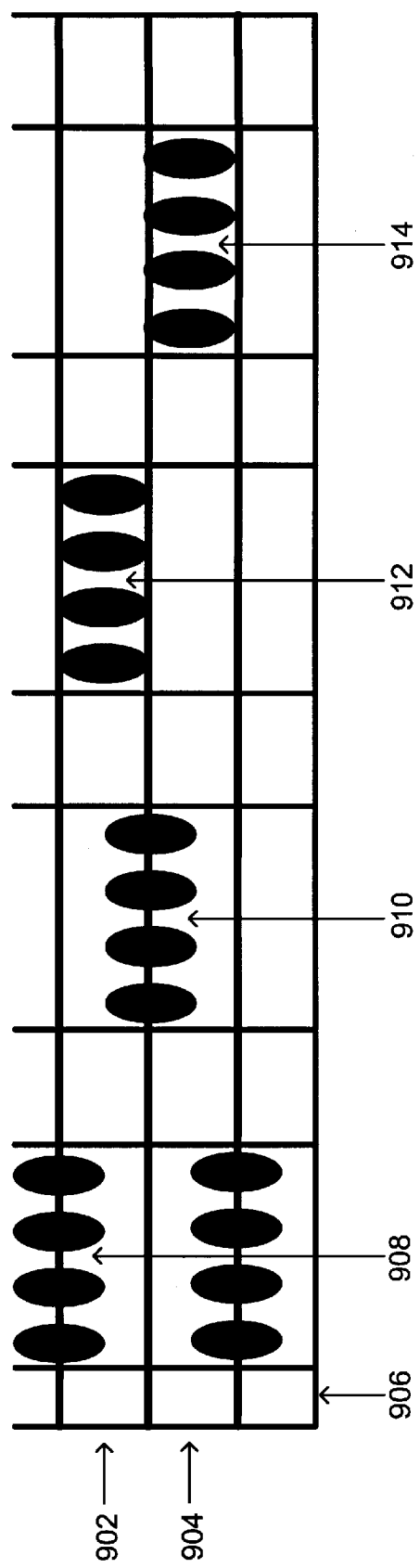
FIG. 9 is a diagram of one embodiment for a physical layout of position error signal blocks and delay fields, in accordance with the present invention.

Referring now to FIG. 9, one embodiment for position error signal blocks, the final components of servo sector 402, are shown. For purposes of illustration, two neighboring tracks 902 and 904 are depicted in FIG. 9; the first, 902, is the target track to which read/write head 210 is to be moved, and the next, 904, is a neighboring track which shares some of the embossed pits. The complement of the Z bit is preferably written on every servo sector 402 so that a positive mark will always be available in field 610 of FIG. 6. The blank position 906 (which is in field 612 of FIG. 6) is used to precisely separate the beginning of the position error signal blocks from the end of the Z bit or its complement, in the preferred embodiment. The elapsed time between the reading of the Z bit or its complement and the beginning of the position error signal blocks is used by storage system controller 204 to compensate for variations in the rotational speed of recording disk 202 and to synchronize the spacing of pit positions 504. Use of the a priori knowledge that the Z bit or its complement provide a definite mark in field 610 of FIG. 6 further verifies that servo sector 402, versus a sequence of reflectivity variations due merely to contamination, is read.

In the preferred embodiment, and referring to target track 902, a block 908 of four pits 506 is placed above or radially away from spindle 212, and then a similar block 910 is placed below or radially toward spindle 212, off the centerline of each track 214. A subsequent block 912 of four pits 506 is preferably placed directly on the centerline of the target track 902, and then a final block 914 is placed directly off the centerline of the target track 902, completing a quadrature pattern. The relative reflectivity of the position error signal blocks is preferably used to precisely control radial positioning of read/write head 210 over the centerline of a track 214. Blank positions 504 placed between the position error signal blocks 908, 910, 912 and 914 and directly after the last position error signal block 914 are preferably used to create discharge delays for analog integrators used in position sensing circuitry.

Figure 10:
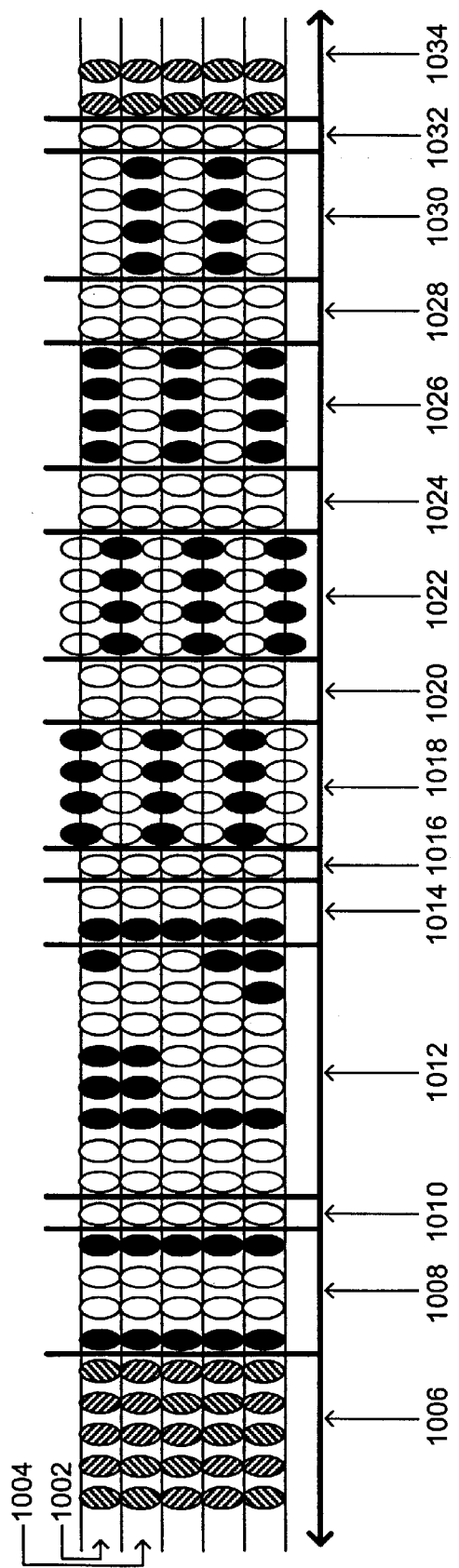
FIG. 10 is a diagram of one embodiment for a physical layout of an entire servo sector for a set of five tracks, as well as portions of neighboring data wedges, in accordance with the present invention.

Referring now to FIG. 10, a diagram of one embodiment for the physical layout of an entire servo sector 402 for five neighboring tracks 214 is shown. In FIG. 10, solid marks indicate positions with pits 506, open marks indicate blank pit positions 504, and shaded marks indicate positions 504 that include recorded user data. Although the recording surface mastering equipment is capable of radially overlapping pits 506 to enhance their detection, such overlapping is omitted here for clarity.

Suppose that sector number 234 is shown in FIG. 10, with track number 5,678 (00010110 00101110 binary) depicted by 1002, and track number 5,679 (00010110 00101111 binary) depicted by 1004. Field 1006 represents data wedge 404 preceding servo sector 402. The last five positions 504 of data wedge 404 are preferably monitored for reflectivity deviations indicating a surface defect. Field 1008 includes servo timing mark 502, with the "1001" pattern denoting the beginning of servo sector 402 and further assuring surface quality. Field 1010 includes the X bit, which is part of the 00010111 pattern preferably repeated over the circumference of the recording surface. The X bit for sector 234 is 0, the third digit in the pattern. The phase of the sector is preferably determined from the subsequently read X bits of consecutively following sectors 306, in this case 010.

Field 1012 includes the lower-order byte of the track address. The Gray-encoded high-order track address byte comprising bits Y15–Y8 is 00010101. The separately Gray-encoded lower-order track address byte comprising bits Y7–Y0 is 00111001 for track 5,678. The Z bit for this sector includes bit Y10=1 of the higher-order byte of the track address; either the sector number in the counter of storage system controller 204 or the phase of sector 306 from the pattern of X bits may be used to determine that the correct Z bit is Y10, and not another value. The Z bit and its complement are preferably placed in field 1014. Field 1016 is a blank position 504 between the Z bit or its complement and the beginning of the position error signal blocks. The synchronization of pit positions 504 and the true rotational speed of recording disk 202 are determined by the spacing from the positive mark in field 1014 and the beginning of the position error signal block in field 1018.

Fields 1018, 1022, 1026, and 1030 preferably include the blocks of four pits 506 that generate position error signals. The first two position error signal blocks are halfway off the track centerline in radially opposite directions, and the next two are directly on or directly off the track centerline. This pattern alternates for the next track 1004, but the information needed to precisely center read/write head 210 over track 1004 centerline is obtained in the same manner. As recording disk 202 rotates in the preferred embodiment, storage system controller 204 receives position error signals as the position error signal blocks pass beneath read/write head 210. The radial position information initially received from the position error signal blocks in servo sectors 402 of start-up zone 302 is preferably used to estimate the rotationally repeating radial drift of all tracks 214, due to imprecision in centering recording disk 202 on spindle 212.

Fields 1020, 1024, and 1028 are integrator delay fields that are preferably two bits in length. Field 1032 is an integrator delay field that is one bit in length and is the final field in the servo sector 402 in the preferred embodiment. Field 1034 is the data wedge 404 to which servo sector 402 has guided and aligned read/write head 210 and preferably helped to certify against surface contamination.

Figure 11:
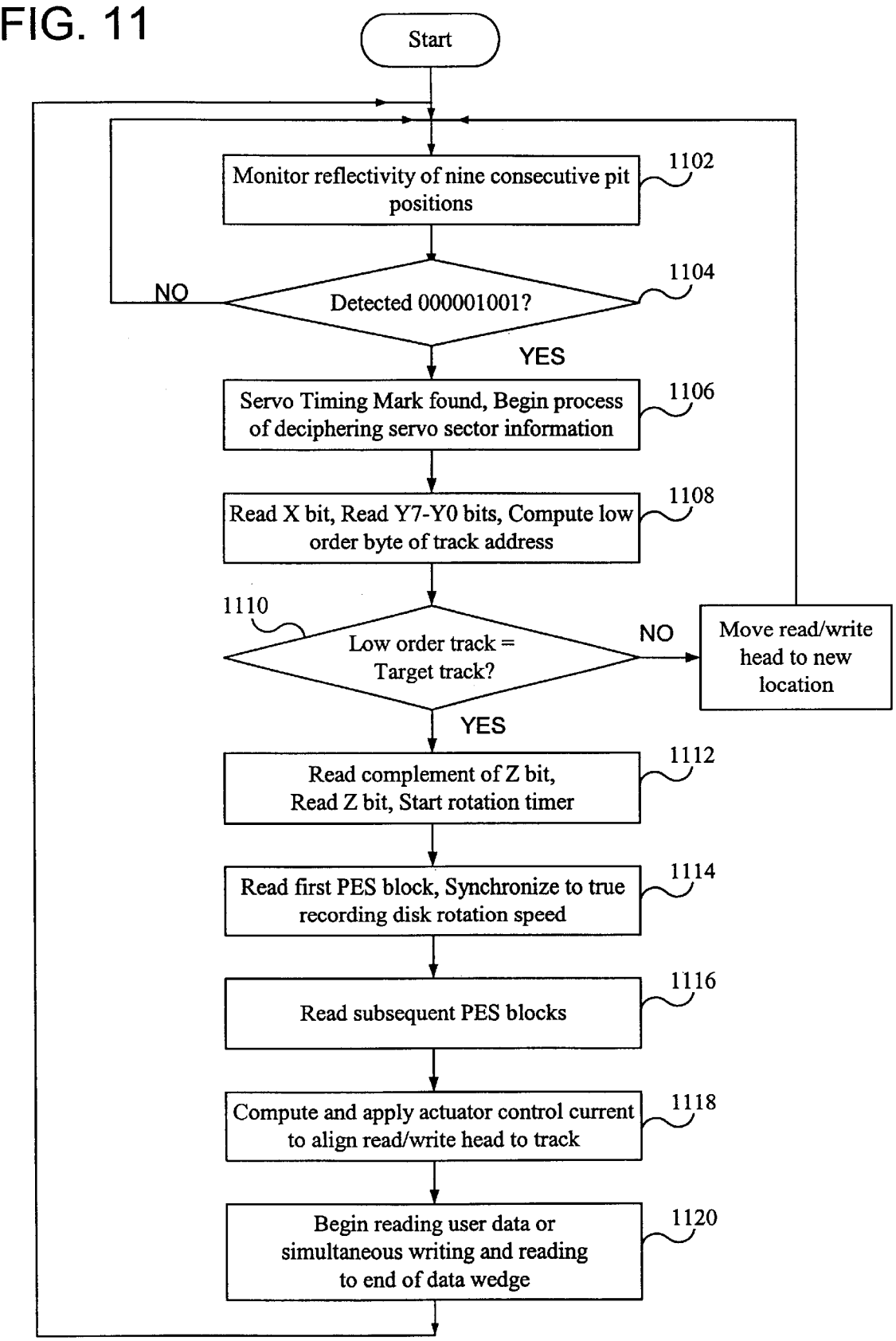
FIG. 11 is a flowchart of one embodiment of method steps for performing servo sector processing, in accordance with the present invention.

Referring now to FIG. 11, a flowchart of one embodiment of method steps for implementing a servo sector 402 processing scheme is shown, in accordance with the present invention. Initially, in step 1102, storage system controller 204 monitors the reflectivity of pit positions 504 pas sing under read/write head 210. In step 1004, when the qualified servo timing mark 502 pattern (preferably 000001001) determines the beginning of servo sector 402, then in step 1006 the process of decoding servo sector 402 data begins. In step 1108, storage system controller 204 reads the X bit and then the bits Y7–Y0 are read and decoded to obtain the low-order byte of the track address.

In step 1110, if the low-order byte of the track address matches that of the target track 1002, then read/write head 210 is very probably in the right location. Subsequently read sectors 306 will provide the higher-order track address bits to completely verify read/write head 210 location. If the low-order byte of the address is not correct, then read/write head 210 is in the wrong location and servo actuator 208 responsively moves read/write head 210 toward the correct location.

In step 1112, once the correct track 1002 is located, storage system controller 204 reads the complement of the Z bit and the Z bit to provide a positive mark. A synchronization timer (not shown) in storage system controller 204 is preferably started by the positive mark. In step 1114, storage system controller 204 stops the synchronization timer at the beginning of the first position error signal, and computes the true rotational speed of recording disk 202 used for logic synchronization.

In step 1116, storage system controller 204 reads the remaining position error signal blocks. In step 1118, storage system controller 204 computes and applies the proper correction current to servo actuator 208 to put read/write head 210 precisely over the center of target track 1002. In step 1120, storage system controller 204 reads user data, or simultaneously writes and reads user data (avoiding write-to-read recovery delays of conventional magnetic disk drives) until the end of data wedge 404 is reached, at which point the FIG. 11 process returns to step 1102 and the next servo sector 402 begins.

While the invention has been described with reference to a specific embodiment, the description is intended for purposes of illustration only and should not be construed in a limiting sense. Various modifications of and changes to the disclosed embodiment, as well as other embodiments of the invention, will be apparent to those of ordinary skill in the art, and may be made without departing from the true spirit of the invention. It is therefore contemplated that the language of the following claims will cover any such modifications or embodiments that fall within the true scope of the invention.

What is claimed is:

1. A system for encoding information in a memory device, comprising:
    a storage medium coupled to said memory device, including a servo timing mark denoting a border between servo sectors and data wedges;
    said servo sectors including an encoded track address, an encoded sector address, and alignment indicia, wherein at least a portion of said servo sectors are comprised of destructive interference pits of reflectivity indelibly placed into said servo sectors;
    whereby said memory device determines a location on said storage medium.

2. The system of claim 1, wherein said location is referenced by sequentially numbered concentric tracks, and by sequentially numbered angularly-spaced arc-shaped servo sectors between said data wedges.

3. The system of claim 1, further including indexing marks comprised of destructive interference pits of reflectivity indelibly placed into said servo sectors, wherein said destructive interference pits of reflectivity are comprised of destructive interference pits of uniform reflectivity indelibly placed into said servo sectors to eliminate write-to-read recovery time and reflectivity reference blocks.

4. The system of claim 1, wherein reflectivity measurements of a portion of said data wedge and a portion of said servo sector certify said location against recording surface defects, with said reflectivity measurements being simultaneous with Kerr rotation reading of recorded data to eliminate read-after-write verification delays.

5. The system of claim 1, wherein a servo timing mark comprising low reflectivity destructive interference pits separated by blank pit positions of appropriate surface reflectivity, preceded by pit positions of appropriate surface reflectivity, indicates the beginning of said servo sector.

6. The system of claim 1, wherein said track address comprises a Gray-encoded high byte indelibly distributed over consecutive sectors to infrequently verify the full track address.

7. The system of claim 6, wherein a repeating sequence of bits is distributed over consecutive sectors, and wherein the phase of said sequence determines the proper significance of said distributed track address high byte bits.

8. The system of claim 6, wherein said distributed track address high byte bit and the complement of said bit are placed into said servo sectors to provide a definite mark to trigger arrival time measurement of another mark, to enable pit position synchronization with recording surface speed.

9. The system of claim 1, wherein said track address comprises a Gray-encoded low byte indelibly placed into said servo sectors to frequently verify the partial track address from a few neighboring tracks having almost identical addresses.

10. The system of claim 1, wherein said encoded sector address is verified from a repeating sequence of bits distributed over consecutive sectors, with interruption of said repeating sequence indicating a return to an initial sector address.

11. A method for encoding information in a memory device, comprising the steps of:
    creating a servo timing mark on a storage medium to denote a border between servo sectors and data wedges;
    creating alignment indicia in said servo sectors, wherein at least a portion of said servo sectors are comprised of destructive interference pits of reflectivity;
    encoding a track address on said storage medium; and
    encoding a sector address on said storage medium;
    whereby said memory device determines a location on said storage medium.

12. The method of claim 11, wherein said location is referenced by sequentially numbered concentric tracks, and by sequentially numbered equally angularly-spaced arc-shaped servo sectors between said data wedges.

13. The method of claim 11, further including the step of creating indexing marks in said servo sectors, wherein said indexing marks and alignment indicia are comprised of destructive interference pits of uniform reflectivity indelibly placed into said servo sectors to eliminate write-to-read recovery time and reflectivity reference blocks.

14. The method of claim 11, wherein reflectivity measurements of a portion of said data wedge and a portion of said servo sector certify said location against recording surface defects, with said reflectivity measurements being simultaneous with Kerr rotation reading of recorded data to eliminate read-after-write verification delays.

15. The method of claim 11, wherein a servo timing mark comprising low reflectivity destructive interference pits separated by blank pit positions of appropriate surface reflectivity, preceded by data wedge pit positions of appropriate surface reflectivity, indicates the beginning of said servo sector.

16. The method of claim 15, wherein said servo timing mark comprises two low reflectivity destructive interference pits separated by two blank pit positions of appropriate surface reflectivity, preceded by five data wedge pit positions of appropriate surface reflectivity.

17. The method of claim 11, wherein said track address comprises a high byte indelibly distributed over consecutive sectors to infrequently verify the full track address.

18. The method of claim 17, wherein a repeating sequence of bits is distributed over consecutive sectors, and wherein the phase of said sequence determines the proper significance of distributed track address high byte bits.

19. The method of claim 17, wherein said distributed track address high byte bit and the complement of said bit are placed into said servo sector to provide a definite mark to trigger arrival time measurement of another mark, to enable pit position synchronization with recording surface speed.

20. The method of claim 19, wherein the known presence of said definite mark further validates the detection of said servo timing mark.

21. The method of claim 17, wherein said distributed high byte is Gray-encoded.

22. The method of claim 11, wherein said track address comprises a low byte indelibly placed into said servo sectors to frequently verify the partial track address from a few neighboring tracks known a priori to have almost identical addresses.

23. The method of claim 22, wherein said low byte is separately Gray-encoded.

24. The method of claim 11, wherein said encoded sector address is verified from a repeating sequence of bits distributed over consecutive sectors, with interruption of said repeating sequence indicating a return to an initial sector address.

25. The method of claim 24, wherein said repeating sequence of bits follows a 00010111 pattern.

26. The method of claim 11, wherein a first portion of said track address is encoded in a parallel manner and a second portion of said track address is encoded in a serial manner.

27. The method of claim 11, wherein a first portion of said track address is encoded onto each of said servo sectors and a second portion of said track address is encoded across multiple servo sectors.

28. The method of claim 11, wherein said storage medium is a magneto-optical recording disk.

29. A system for encoding information in a memory device, comprising:

means for coupling a storage medium to said memory device;

means for creating a servo timing mark denoting a border between servo sectors and data wedges;

means for creating alignment indicia in said servo sectors, wherein at least a portion of said servo sectors are comprised of destructive interference pits of reflectivity;

means for encoding a track address; and means for encoding a sector address;

whereby said memory device determines a location on said storage medium.

30. A computer-readable medium comprising program instructions for encoding information in a memory device by performing the steps of:

coupling a storage medium to said memory device;

creating a servo timing mark denoting a border between servo sectors and data wedges;

means for creating alignment indicia in said servo sectors, wherein at least a portion of said servo sectors are comprised of destructive interference pits of reflectivity;

encoding a track address; and encoding a sector address;

whereby said memory device determines a location on said storage medium.

31. A servo sector pattern for a storage medium, comprising:

a servo timing mark to denote a border between servo sectors and data wedges;

a track address field;

a sector address field; and position error signal blocks, wherein at least a portion of said servo sector is comprised of destructive interference pits of reflectivity, whereby said portion of said servo sector is read via changes in reflectivity measurements.

32. The servo sector of claim 31, wherein said servo timing mark is comprised of at least one destructive interference pit of reflectivity indelibly placed into said servo sector.

33. The servo sector of claim 32, wherein said position error signal blocks are comprised of destructive interference pits of reflectivity indelibly placed into said servo sector.

34. The servo sector of claim 33, wherein said destructive interference pits of reflectivity are comprised of destructive interference pits of uniform reflectivity.

35. The servo sector of claim 34, wherein reflectivity measurements of at least a portion of said servo sector occurs simultaneously with Kerr rotation reading of recorded data.

36. The servo sector of claim 31, wherein said track address field is comprised of a Gray-encoded high byte.

37. The servo sector of claim 31, wherein said track address field is comprised of a Gray-encoded low byte.

38. The servo sector of claim 31, wherein the storage medium is comprised of a magneto-optical recording disk.

* * * * *